(12) United States Patent
Ricky (10) Patent No.: US 9,737,817 B1
(45) Date of Patent: *Aug. 22, 2017

(54) METHOD AND APPARATUS FOR SIMULATING A GAMING EVENT

(71) Applicant: Brett Ricky, Overland Park, KS (US)

(72) Inventor: Brett Ricky, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/462,411

(22) Filed: Mar. 17, 2017

Related U.S. Application Data

(63) Continuation-in-part of application No. 15/182,146, filed on Jun. 14, 2016, now Pat. No. 9,604,136, which is a continuation-in-part of application No. 14/613,160, filed on Feb. 3, 2015, now Pat. No. 9,636,578.

(60) Provisional application No. 61/935,064, filed on Feb. 3, 2014.

(51) Int. Cl.
    A63F 9/24      (2006.01)
    A63F 13/812    (2014.01)
    A63F 13/245    (2014.01)
    A63F 13/211    (2014.01)
    A63F 13/285    (2014.01)
    A63F 13/213    (2014.01)

(52) U.S. Cl.
    CPC .......... *A63F 13/812* (2014.09); *A63F 13/211* (2014.09); *A63F 13/213* (2014.09); *A63F 13/245* (2014.09); *A63F 13/285* (2014.09)

(58) Field of Classification Search
    CPC .... A63F 13/812; A63F 13/211; A63F 13/213; A63F 13/245; A63F 13/285
    See application file for complete search history.

(56) References Cited

U.S. PATENT DOCUMENTS

| | | | |
|---|---|---|---|
| 2008/0312010 A1* | 12/2008 | Marty | A63B 24/0003 473/447 |
| 2012/0258799 A1* | 10/2012 | Jouet | A63F 13/211 463/36 |
| 2012/0262558 A1* | 10/2012 | Boger | G02B 27/0093 348/61 |
| 2013/0229330 A1* | 9/2013 | Elyada | G09G 5/00 345/156 |
| 2016/0151696 A1* | 6/2016 | Chen | A63B 69/3614 473/199 |
| 2016/0199693 A1* | 7/2016 | Vermilyea | A61B 5/6831 700/91 |
| 2016/0202755 A1* | 7/2016 | Connor | A61B 5/1126 73/865.4 |
| 2016/0224657 A1* | 8/2016 | Mullins | G06F 17/30864 |
| 2017/0001072 A1* | 1/2017 | Brekke | A63B 60/46 |
| 2017/0054899 A1* | 2/2017 | Sadhwani | H04N 5/23222 |

* cited by examiner

*Primary Examiner* — Corbett B Coburn (74) *Attorney, Agent, or Firm* — Dale J. Ream (57) ABSTRACT

An electronics module in a gaming device includes an inertial measurement unit ("IMU") for detecting acceleration motion, angular movements, and an optics assembly to optimally calculate a moment of impact and to predict a virtual trajectory of a virtual golf ball or other hypothetical object. The virtual trajectory of the target object may be displayed on a display screen either on the gaming device itself, on a computer, or on a television display. A haptics member, such as a vibration or sound element is positioned in the shaft housing and actuated to simulate a ball impact when the shaft housing is indicative of a swing.

20 Claims, 8 Drawing Sheets

METHOD AND APPARATUS FOR SIMULATING A GAMING EVENT

REFERENCE TO RELATED APPLICATIONS

This application claims the benefit of U.S. Ser. No. 15/182,146, filed Jun. 14, 2016 entitled Golf Club Simulation Apparatus which claims the benefit of U.S. Ser. No. 14/613,160, filed Feb. 3, 2015 entitled Golf Club Simulation Apparatus which claims the benefit of provisional patent application U.S. Ser. No. 61/935,064 filed Feb. 3, 2014 titled Golf Club Simulation Apparatus, said prior applications being incorporated in their entireties, respectively.

BACKGROUND OF THE INVENTION

This invention relates generally to sporting device simulators and, more particularly, to a method and electronic simulation apparatus that provides a realistic electronic gaming experience using a handheld gaming device such as, in an exemplary embodiment, a golf club shaft and simulation apparatus.

The market for electronic gaming systems is enormous—there are 1.2 billion electronic gamers worldwide, 700 million playing online games and an estimated 120 million playing golf related games once a week or more. While sports-related games are the first to come to mind when thinking of "gaming," it is understood that non-sporting related games are also popular that require a gamer to swing an object. For instance, games may simulate swinging an axe, a sword, a weapon, or the like. Sports, however, provide a good example and will be referenced more particularly in the following disclosure.

Therefore, it would be desirable to have a method and apparatus that actually influences gamers to actually try a sport and train the user regarding the skills and techniques of the sport. In an exemplary embodiment that will be referenced throughout this disclosure, it would be desirable to have a golf club simulation apparatus that combines the thrill of sports simulation with the physical experience of actually swinging a real golf club. Further, it would be desirable to have a golf club simulation apparatus that is able to change its weight distribution and shaft flexibility/bend so as to simulate the actual feel of selected clubs. In addition, it would be desirable to have a golf club simulation apparatus that trains a user the proper angle of shaft orientation for each of a selectable number of clubs while using only a fixed length club (or a limited variable length club) which allows for swinging indoors without ceiling height restrictions.

Although golf is a popular game, the number of people actually playing real golf on a golf course has stagnated in recent years for a number of reasons, including (1) the difficulty of the game without significant practice or game play, and (2) the significant amount of time required for learning proper swing techniques. Simply playing casual video games with traditional interfaces (such as with mouse clicks and joysticks) does not teach realistic swing technique that will encourage gamers to develop actual game skills and then to go out and play the game.

Further, traditional golf simulators have attempted to simulate a golf game through computer software and even using a hand-held device in the nature of a wand. Although assumably effective for their intended purposes, the existing devices focus on the visual representations of respective golf courses, hypothetical wind and geographic conditions, and timing of swinging a simulated golf club. The existing golf simulation products do not enable a user to feel and experience the actual length, weight, swing speed/resistance, and impact of actually striking a golf ball. For instance, casual video games, such as on smart phones, online games, and console games, are not effective to teach real golf game skills or to encourage gamers to actually play the game with real golf clubs. Conversely, golf swing training devices require the use of real clubs along with optic technologies including cameras.

One major limitation of electronic golf games is the inability to calculate and show the actual trajectory of a golf ball impacted by the "virtual swing" of a golf club. In other words, if an actual shaft or wand is being swung or if a ball strike is just a matter of pressing a keyboard button or clicking a mouse, the speed, angle, rotation, and other parameters are not captured, calculated, or applied to an impact with a virtual target object—in this case, a golf ball.

More particularly, existing devices are incapable of associating the position, speed, and rotational characteristics of the swinging object (for example, a golf club) with a target object or landmark (for example, a "virtual" golf ball). The present invention provides these limitations of the prior art as will be described below.

Therefore, it would be desirable to have a method and apparatus for simulating a gaming event (such as golf) having an inertial measurement unit ("IMU") that is configured to detect and generate rate of acceleration data and angular rotation data of a gaming device. In an exemplary embodiment, the gaming device may be a shaft indicative of a golf club. Further, it would be desirable to have a method and apparatus for simulating a gaming event having an optics assembly associated with the gaming device that includes an image sensor in communication with the IMU and a target object displaced from the image sensor. Together, the image sensor and IMU data may be used to calculate a virtual trajectory of the target object having been impacted or interacted by the gaming device (e.g. golf club).

SUMMARY OF THE INVENTION

A method and apparatus for simulating a gaming event according to the present invention has a goal of changing the way people interact with casual games on mobile devices, console games, and the like, and to influence gamers to actually engage in a sport. The present invention will be useful with thousands of IOS, Android, and Console games that exist today by incorporating the real sensations of the sport or sports equipment being simulated. For instance, if a golf experience is implemented, the present invention will include a ball flight model, real club feel, club position angle sensor, ball impact sensation, and other haptic features—all of which will be described below. A simulation apparatus and method is designed to interact with two visual mediums: (1) an onboard display screen, and (2) a game platform on a remote electronic device, such as an IOS, Android, tablet, consoles, personal computer, laptop, cloud based games, and the like. The simulation apparatus and method may communicate with both visual mediums via wireless communications such as Bluetooth.

Specifically, an object of this invention is to "Turn Gamers into Golfers" or, more generally, turning gamers into enthusiasts of the respective sport being simulated. The apparatus according to the present invention is intended to replace traditional video game controllers such as joy sticks with minor haptic responses (vibration or sound), a computer mouse, mobile touch screen interfaces, and even cameras such as the Wii™. Existing game interfaces do not have a realistic feel interactive interface.

The present apparatus allows for home use so that beginners can play a little and come back often without having to have dedicated travel and golf driving range humiliation. In addition, the avid golfers in the US (about 6.2 million) can use the present apparatus inside and outside and the feedback will allow them to make swing changes, practice and improve.

According to the present invention, an electronics module in a gaming device may include an inertial measurement unit ("IMU") for detecting acceleration motion, angular movements, and an optics assembly to optimally calculate a moment of impact and to predict a virtual trajectory of a virtual golf ball or other hypothetical object. The virtual trajectory of the target object may be displayed on a display screen either on the gaming device itself, on a computer, or on a television display. A haptic member, such as a vibration or sound element is positioned in the shaft housing and actuated to simulate a ball impact when the shaft housing is indicative of a swing.

Another example is to use a game controller to fight in an augmented reality game such as training to be a professional fencing competitor. The experience does not feel "real" unless the tip of sword is estimated precisely. The results of game play are inauthentic without sensing both the gaming device and the virtual object it is intended to touch, e.g. an opponent's body.

It is understood that the technology presented herein may include a software development module or kit that will be integrated into existing and future electronic gaming systems.

Therefore, a general object of this invention is to provide a method and apparatus for simulating a gaming event that combines the experience of swinging a sports related device (referred to later as a "handheld gaming device") with the enjoyment of a video game that simulates the respective gaming event.

Another object of this invention is to provide a method and apparatus for simulating a gaming event, as aforesaid, in which the handheld gaming device includes an inertial measurement unit ("IMU") that detects and generates rate of acceleration data and angular rotation data.

Still another object of this invention is to provide a method and apparatus for simulating a gaming event, as aforesaid in which the handheld gaming device simulates an interaction (e.g. an impact) with a target object (e.g. a virtual golf ball) when making a golf swing of the club, such as with haptic elements such as vibrations and sound.

Yet another object of this invention is to provide a method and apparatus for simulating a gaming event, as aforesaid, that includes an optic assembly having an image sensor in data communication with the IMU and a target image member displaced from the image sensor, the image sensor configured to generate image target data indicative of a spatial position of the image target member.

A particular object of this invention is to provide a method and apparatus for simulating a gaming event, as aforesaid, in which the generated acceleration data, angular rotation data, and image target data together enable the calculation of a virtual trajectory of the image target when virtually impacted as a result of motion of the gaming device (e.g. impact by a club).

Another object of this invention is to provide a method and apparatus for simulating a gaming event, as aforesaid, in which the camera and IMU are mounted to the gaming device and the camera is configured to "see" the target object displaced from the gaming device.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 5b is a side view of the golf club simulation apparatus as in FIG. 5a;

FIG. 5c is a sectional view taken along line 5c-5c of FIG. 5a;

FIG. 7b is a side view of the input assembly as in FIG. 7a;

FIG. 8b is a perspective view of the grip member as in FIG. 8a; and

FIG. 8c is a bottom side view of the grip member as in FIG. 8a.

DESCRIPTION OF THE PREFERRED EMBODIMENT

A method and apparatus for simulating a gaming event according to a preferred embodiment of the present invention will now be described in detail with reference to FIGS. 1a to 8c of the accompanying drawings. The method and apparatus according to a preferred embodiment includes a handheld gaming device 10 that is useful in simulating one or more gaming activities or other functions analogous to gaming. For the benefit of discussion and understanding the functionality of the present invention, the gaming device 10 is illustrated in the accompanying drawings in the form of a golf club in use simulating a golf swing and realistic game play. In an exemplary but non-limiting embodiment, the gaming device 10 illustrated herein may include a shaft housing 120, a grip member 130, a club head housing 140, and an electronics module 160 having an inertial measurement unit ("IMU") 161. However, it is understood that the IMU 161 may also be incorporated into gaming devices configured to simulate the playing of other sports, other games, or analogous activities involving the motion of a device.

Regardless of the form of its housing (which includes a shaft housing 120 in the exemplary embodiment shown in the present drawings), the handheld gaming device 10 includes an inertial measurement unit ("IMU") 161 that is configured to detect and generate rate of acceleration data and angular rotation data. More particularly, the gaming device 10 according to the present invention includes an electronics module 160 coupled to the gaming device (e.g. to a shaft housing 120) and to a processor 104 or control circuitry. The electronics module 160 may include a processor 104. Operation of the processor 104 may by execution of programming instructions stored in a non-volatile memory 106 or by pre-printed circuitry and other electronics. Operation of the processor 104 according to program instructions, however, may be described simply as the processor 104 being "programmed" to operate in the manner as will be described later.

Now more particularly, the electronics module 160 includes an inertial measurement unit ("IMU") 161 having an accelerometer 162, gyroscope 163, and magnetometer 164. The IMU 161 is configured to analyze many parameters in real time when the club is swinging, such as, but not limited to, swing speed, angular velocity, the weight variation settings (to be described later), air resistance/drag for a selected club, or the like. Operation of the IMU 161 will be even further described below. But, first, an exemplary embodiment of the present invention will be described in order to facilitate understanding of operation of the present invention.

Figure 1A:
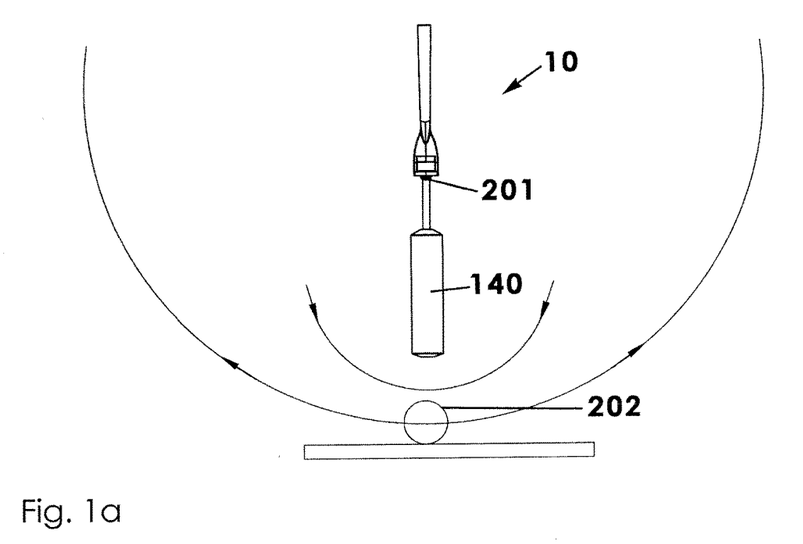
FIG. 1a is a diagrammatic view of a golf club simulation apparatus according to a preferred embodiment of the present invention in use with an inertial measurement unit and optics assembly.
Figure 1B:
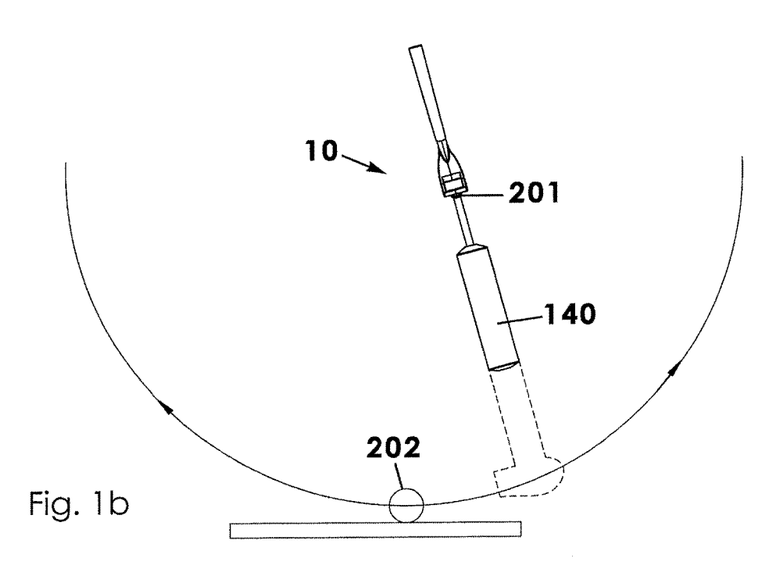
FIG. 1b is another diagrammatic view of the golf club simulation apparatus as in FIG. 1a in use with an inertial measurement unit (IMU)
Figure 2:
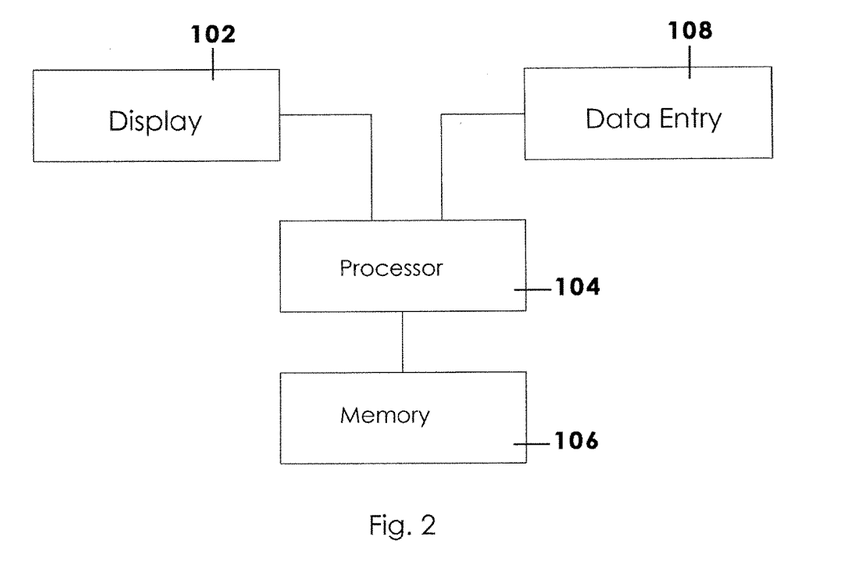
FIG. 2 is a block diagram of an input assembly according to the present invention.
Figure 3:
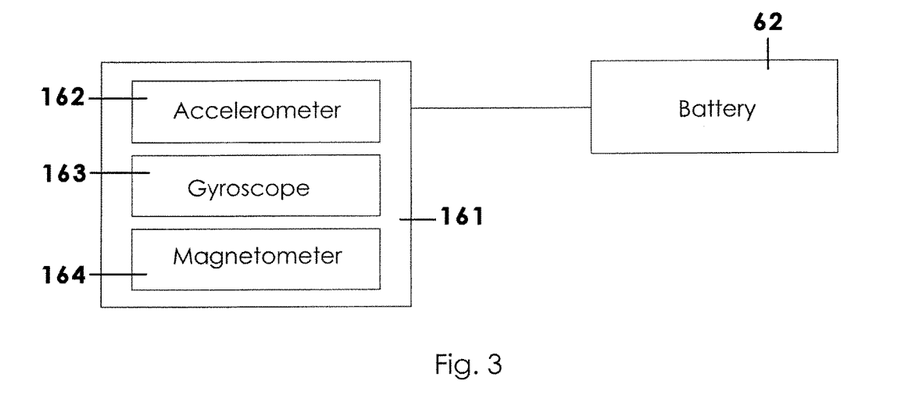
FIG. 3 is a block diagram of the inertial measure unit (IMU) as in FIG. 2.
Figure 4:
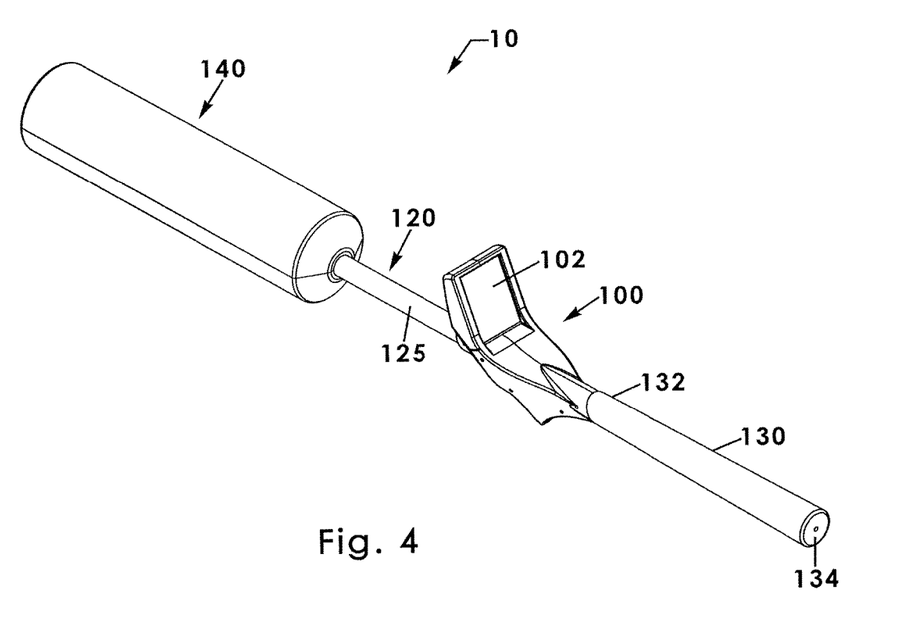
FIG. 4 is a perspective view of the golf club simulation apparatus according to the present invention.
Figure 5A:
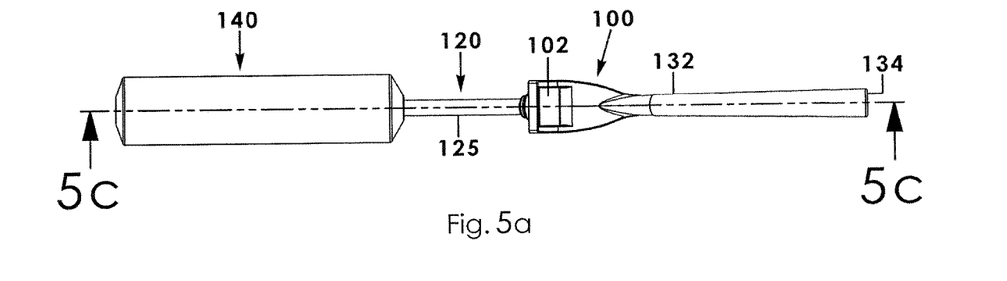
FIG. 5a is a top view of the golf club simulation apparatus as in FIG. 4.
Figure 5B:
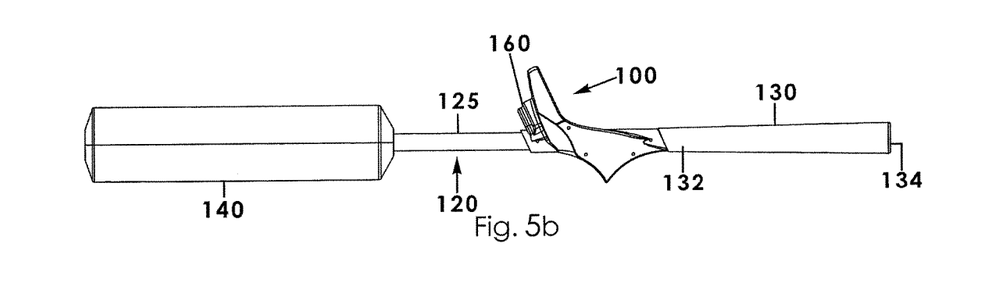
Figure 5C:
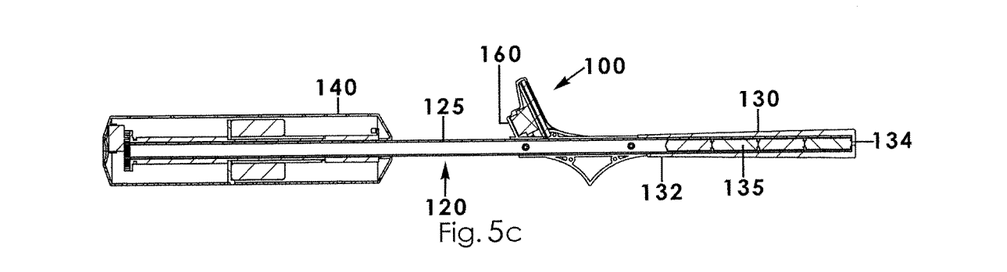
Figure 5D:
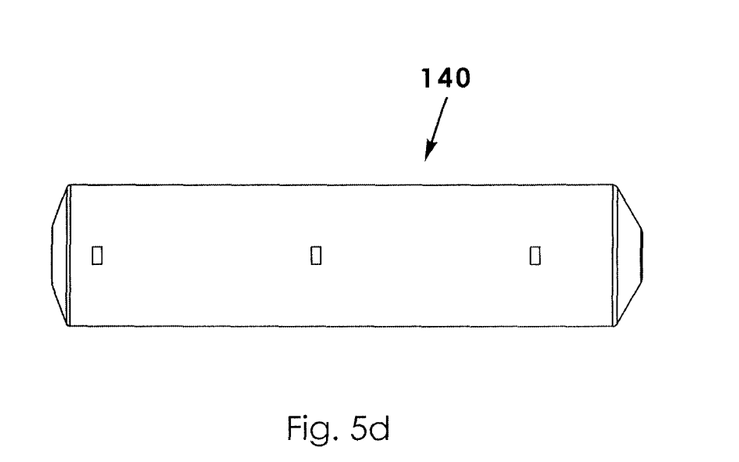
FIG. 5d is a top view of the head housing as in FIG. 4.
Figure 6:
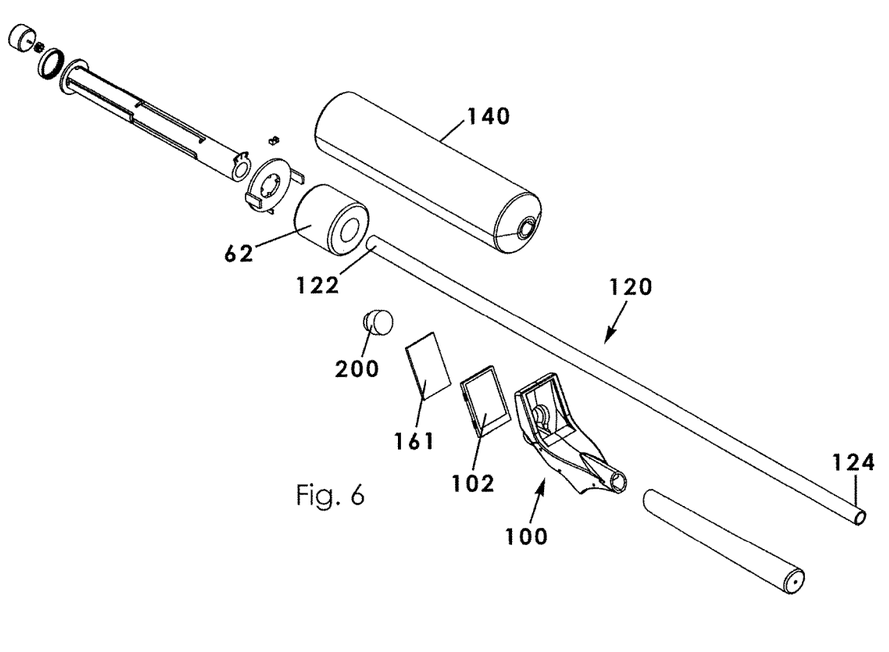
FIG. 6 is an exploded view of the golf club simulation apparatus as in FIG. 4.
Figure 7A:
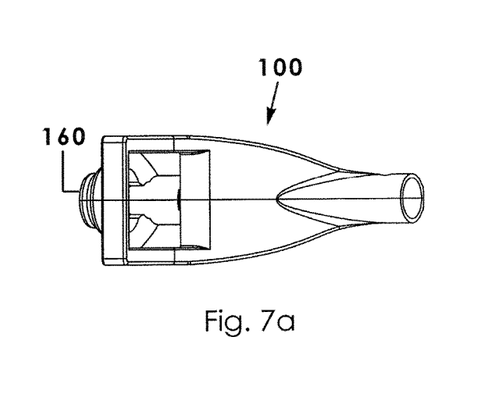
FIG. 7a is a top view of an input assembly as in FIG. 6.
Figure 7B:
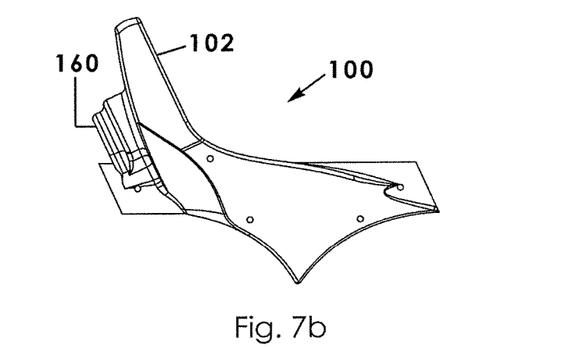
Figure 7C:
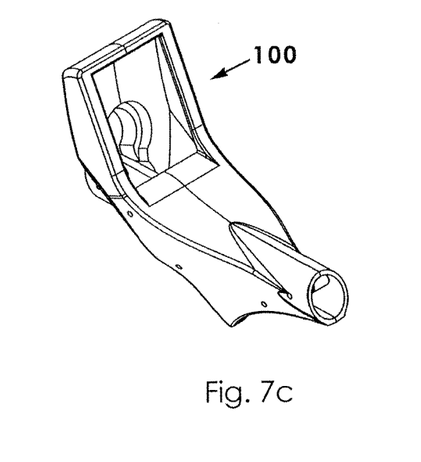
FIG. 7c is a perspective view of the input assembly as in FIG. 7b.
Figure 8A:
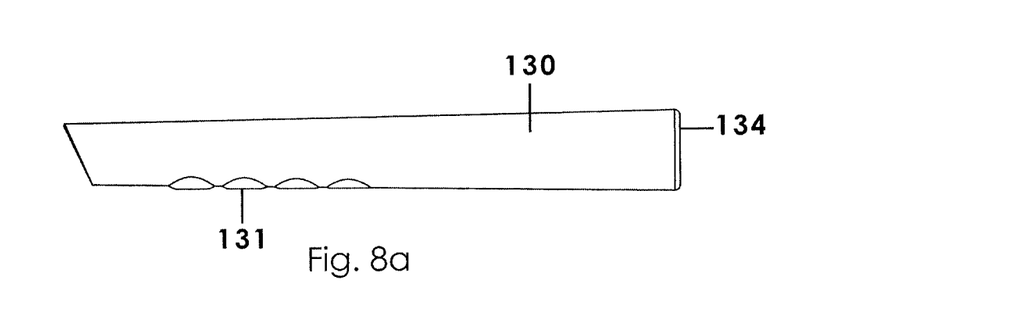
FIG. 8a is a side view of the grip member as in FIG. 6.
Figure 8B:
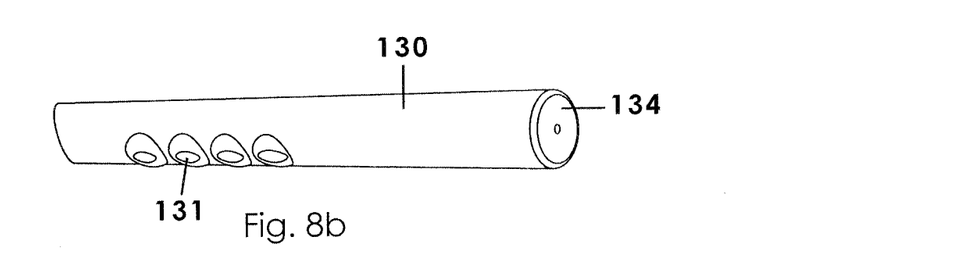
Figure 8C:
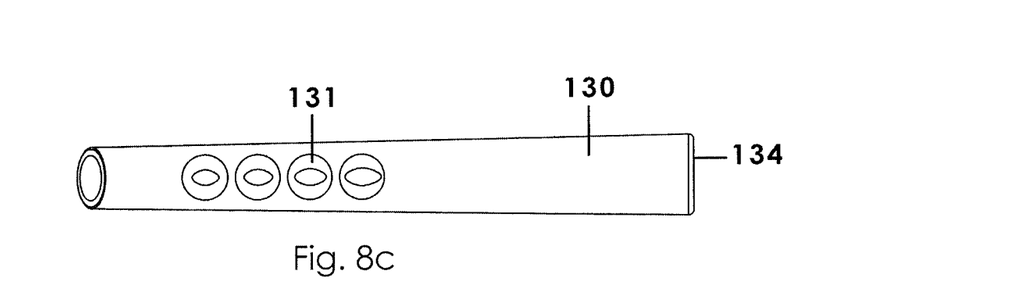

The elongate shaft housing 120 includes opposed lower 122 and upper 124 ends (FIG. 4). The shaft housing 120 defines an interior area between upper and lower ends such that other assemblies and electronics may be positioned therein. The shaft housing 120 may also include a channel coupled to an inner or outer surface of the shaft housing 120 and extending longitudinally, the channel being configured to receive wires electrically connecting respective electronic components, battery 62, and respective motors. In other embodiments, electrical communications may be with wireless technology, such as that known as Bluetooth. Preferably, the battery 62 is a rechargeable, six-hour battery.

Preferably, the shaft housing 120 is constructed of a semi-rigid material such as TPE that will bend in a predetermined manner depending on the torque and angular momentum experienced by the shaft housing 120 when the club is swung. The flexible shaft housing construction is particularly preferred in the portion 125 extending between the head housing 140 and the grip member 130.

The grip member 130 includes a proximal end 132 operatively coupled to the upper end 124 of the shaft housing 120 and a distal end 134 opposite the proximal end 132. The grip member 130 may define an interior chamber 135 configured to receive other components. The grip member 130 may include a construction substantially similar to a grip of a traditional golf club in its appearance and tactile characteristics. It is understood that the shaft housing 120, grip member 1 130, head housing 140, and other related structural components will preferably have symmetrical configurations that may be used equally efficiently by either left or right handed users.

A tactile membrane switch 131 (or an array of membrane switches) may be coupled to the grip member 130 and configured to receive user input data as a user's hands grip the grip member 130. The membrane switch 131 is in data communication (via wires or wireless) with the input assembly as will be described later.

Now with further reference to the IMU 161, the accelerometer 162 is configured to detect a rate of acceleration, for example, the motion of the swing of the shaft housing 120, and to generate acceleration data. The gyroscope 163 is configured to detect rotational movement, for example, the angular motion of the shaft housing 120. The accelerometer 162 and gyroscope 163 can each provide 3 distinct channels of data in the x, y, z axis of real world motion. Therefore, six (6) distinct attributes of motion can be represented with just those two components. For example, a dual-axis (2-axis) solid state accelerometer can be used to detect acceleration in 2 directions versus a triple axis accelerometer (3 axis) accelerometer may be used to detect acceleration forces in three dimensions (x, y, and z axis of motion). Further, solid state combinations of accelerometers, gyroscope, and magnetometers may be employed to provide maximum position and motion data.

The captures can be broken down into both translational and rotational movement. Translational movement refers to up/down, left/right, forward/backward movement. Rotational movement refers to pitch, roll, and yaw. The accelerometer measures non-gravitational acceleration forces in the translational movement. The relationship of each coordinate (x, y, z) to the force of the gravity constant of $9.8 \text{ m/s}^2$ will also detect if the object is straight up and down or tilted along one of the other axes.

Unlike the accelerometer 162, the gyroscope 163 can measure rotational forces so it measures the speed of rotation around an axis, also called angular velocity. It measures the degrees of rotation per second or the revolutions per second around an axis. It is not concerned with the translational movement of the object so if one could theoretically hold a wheel perfectly still on all its axes but ran around the room with it, it would not register any change of the angular velocity.

The magnetometer 164 is configured to generate overall spatial orientation and to generate orientation data. The magnetometer is configured to calibrate the IMU by verifying, confirming, or otherwise correcting errors generated by the accelerometer and gyroscope. The magnetometer is in essence configured to provide a means to reduce the error that can be present in the other sensor. It is not measuring a "new" axis that the other two sensors miss but rather, it allows for the fusion of the sensors to provide the opportunity for a better accuracy outcome.

The IMU data generation is important in that the IMU 161 can determine the at-rest angle of the gaming device 10 (i.e. determine attributes of the shaft housing 120 in the preferred embodiment) as well as the in-motion position. In the example of a golf simulating device, predetermined club data stored in memory may be associated with corresponding angles of the shaft housing 120. Further, the IMU 161 is capable of determining a user's club selection by the angle of the housing 120. A current club selection may be published to the display 102 associated with the gaming device 10 so as confirm the user's selection or to give further opportunity to change the selection. Operation of the IMU 161 in this manner is a possible means by which a user inputs data indicative of club selection. In other words, the gyroscope 163 is capable of determining the initial (at rest) spatial position of the shaft housing 120, i.e. a "Starting Position," and, only when in a correct position, may publish a confirmation to the display 102 or, alternately, energize respective LEDs to illuminate so as to indicate the club is ready to swing.

In operation, the accelerometer 162 or gyroscope 163 is configured to analyze many parameters in real time when the handheld gaming device 10 is swinging, such as, but not limited to, swing speed, angular velocity, the weight variation settings, air resistance/drag on the handheld gaming device 10, or the like. In the exemplary embodiment, a gyroscope 163 is capable of determining the initial (at rest) spatial position of the shaft housing 120 ("starting position") and, only when in a correct position, will actuate respective LEDs to illuminate so as to indicate the club is ready to swing.

The motion and rotational data from the IMU 161 described above may be analyzed by circuitry or processor 104 in the electronics module 160 so as to determine a virtual trajectory of a hypothetical image target (e.g. such as a hypothetical golf ball, i.e. the virtual ball path, struck by the head housing 140). Circuitry in the electronics module 160 may then cause the trajectory data to be graphically displayed on the digital display 102 of the input member 100. In an embodiment, motion data and angle data from respective sensors in the electronics module 160 may be transmitted to the processor 104. With further reference to the exemplary embodiment, the processor 104 is electrically connected to the digital display 102 and, executing programming, the trajectory of a virtual ball or other virtual target struck by the head housing 140 as a result of a swing of the shaft housing 120 may be displayed upon the digital display 102. Calculating trajectory may include parameters relating to ball spin, speed, launch angle, dynamic loft, and the like. Using wireless signal transmission, such as Bluetooth, the trajectory or other swing statistics may be transmitted to a remote device such as a laptop computer, remote display screen, or other remote electronic device.

Now, with further reference to the exemplary embodiment of the present invention, a microphone may be in data communication with the processor 104 and configured to collect user input, such as game play instructions, commands, or selections. Applied to the exemplary embodiment of a golf simulating system, the microphone may be positioned within the interior chamber 135 of the grip member 130. Preferably, the microphone is coupled to the distal end 134 of the grip member 130 and is partially situated inside the interior chamber 135 and partially extends from the distal end 134 or is otherwise in communication with the distal end 134, such as through an aperture defined by the distal end 134. The microphone is at least electrically connected to a digital display positioned along the shaft housing 120 or to associated circuitry or processor. In operation, the microphone is configured to receive audible club selection input data from a user and to translate the input data to the display. It is understood that voice recognition software or circuitry may be included as well in order to accurately translate a user's voice command to a meaningful club size indicator to be published by the display. In one embodiment, a speaker may be also be positioned in the interior chamber of the grip member 130 and electrically connected to the microphone so as to audibly confirm the audibly spoken club request or a club requested through input buttons.

In embodiment, a multi-functional input member 100 may be coupled to the handheld gaming device 10 and includes a structure capable of receiving data supplied by a user. The input member 100 is in data communication with the processor 104 which is programmed to alter operation of the system according to the supplied user data. With reference again to the exemplary embodiment, the input member 100 may be coupled to an outer surface of the shaft housing 120 (FIGS. 1 and 2a to 2c). The input member 100 includes a digital display 102 on which may be displayed a club selection, a trajectory of a virtual ball strike, club options, and the like. Further, the input member 100 may include a data entry component such as one or more buttons, a keypad, touch screen elements, a dial, or the like, with which club selections may be made by a user. The input member 100 may include circuitry or, preferably, the processor 104 (described previously) that executes programming instructions stored in a non-transient memory 106, the processor 104 and memory 106 being situated in the input member 100. The processor 104 may be coupled to the digital display 102 and, executing programming, provide a graphic user interface that enables a user to enter club selection data using the data entry component. Predetermined data regarding golf club size, weight, other club characteristics, user selection data, and the like may be stored in the memory 106.

Although satisfactory for providing a "generally accurate" trajectory, the motion and rotational data supplied by the IMU 161 may not be entirely accurate to calculate a true trajectory that depends on how the virtual object (such as a virtual ball) would actually be impacted by the virtual swing. For instance, acceleration and angular data immediately before and immediately after a "moment" of impact are critical to determining an actual and accurate trajectory of the virtual object, e.g. a golf ball.

Therefore, the present invention may also include an optics assembly that is configured to supply the critical data of how the virtual club face of the head housing 140 addresses a tangible landmark representative of the moment of impact. The optics assembly includes an image sensor 201 in data communication with the IMU 161 described above and the processor 104 and includes an image target member 202 (also referred to as a target object 202 or an image target 202) remote and displaced from the image sensor 201. The optics assembly enables the processor 104 to determined the orientation of the gaming device 10 relative to the virtual target object before and after the moment of impact. With reference to the exemplary embodiment, use of the optics assembly to determine the orientation of the head housing 140 relative to an image target member 202 is illustrated in FIGS. 3a and 3b. The image sensor 201 may be included in the electronics module 160 and directed to take pictures of the image target 202. In an embodiment, the image sensor 201 is a camera configured to take a predetermined number of snapshots ("frames") per second (which may be referred as "fps"). The image target 202 may be a tangible device, such a mat, ball, or other landmark, having a plurality of position indicia that, when captured by a respective snapshot by the image sensor 201 and communicated to the processor 104, is indicative of a "moment of impact" with the image target.

It is understood that one or more snapshots of the position data of the image target 202 may be represented and expressed mathematically and used with the IMU data described above to determine a more accurate trajectory of a virtual object. Specifically, the IMU data may be interpreted by the processor 104 executing programming instructions to detect when a swing of the shaft housing 120 is underway so as to actuate the optics assembly to generate optical data before and after the "moment of impact." The unique combination of the IMU and optical assembly may be understood this way: by putting the camera in the gaming device itself, it is possible to identify a landmark through custom image representations and what the IMU is doing before "the moment", after "the moment", and during "the moment".

In the exemplary embodiment, IMU data and data from the optics assembly enable the processor 104, via programming instructions, to more accurately determine a ball flight path or trajectory based on a swing of the shaft housing 120. As described above, the calculated trajectory may then be published to the display 102 for review by a user or may be communicated wirelessly to a remote device, such as a laptop, tablet, smart phone, television, or the like.

In another aspect of the invention, it has been shown that that the correct position of the head and eyes greatly increases the opportunity for a good swing. With further reference to the input member 100 the digital display 102 may be configured to effectively mandate proper eye and head position of a user by only communicating with or being visible by a user when proper hand, foot, or head position is detected or demonstrated. In other words, the screen viewing angle can be restricted so it cannot be viewed until the user has their head and eyes in the best position to start their swing.

In addition, the digital display 102 may include a lenticular lens that makes the display visible only when viewing the digital display 102 at a predetermined angle. Alternatively, the digital display 102 may be configured to have a "limited view" such that the display 102 is hidden from view except at a predetermined angle. Requiring a user's head or hands to be properly positioned before the game device—in this case a golf club—is operable may be referred to as intuitive learning or "Restricted Angle Viewing" or RAV. The user "learns" quickly regarding the required grip, stance, head position, or other positional attributes are correct and which allow play to begin. The display 102 may be an LED or OLED screen configured to intuitively instruct the user on the correct starting position angle for shaft housing 120, their head, and their eyes at the beginning of each swing based upon the club selected. the screen can work in a way that based upon the club selected, the user views the screen and alters the beginning angle of shaft housing 120 until a message appears on the display 102 indicting that shaft housing 120 is in a desirable position to start. Applying this technology to games that are projectile oriented, the game itself could instruct a user on which club should be hit for the desired ball flight model to achieve the desired result.

In still another aspect, actual game play may also be simulated by sound or vibration effects that appeal to a user's senses. The use of sensory effects is referred to as "haptic" design or simulated perception. In the present invention, a haptics member 200 is associated with the handheld gaming device and in data communication with the electronics module 160 or processor 104. In the exemplary embodiment, the haptics member 200 is coupled to the shaft housing 120. It is understood that the haptics member 200 may be a vibration element or a sound-emitting element. The electronics module may also include sound output electronics. For instance, sound output such as a "swoosh" or a ball impact sound may be output to headphones via a wireless Bluetooth arrangement, the sound output being actuated when movement of the gaming device 10 (e.g. the shaft housing 120) is detected and indicative of a swing.

In the exemplary embodiment, by way of example, the sound may be associated with or indicative of precise movements of the shaft housing 120 as detected by the IMU 161. It is understood that the IMU 161 may be configured to generate a vibration activation signal or a sound activation signal when said motion data and angular data are indicative that the shaft housing 120 is in motion and that the head housing 140 is proximate a ground surface or proximate a virtual golf ball. For instance, the sound may be associated with the speed and momentum of the shaft housing 120, i.e. the sound may increase in volume or vary in its tonality or resonance so as to simulate the reality of the sound of the swing of a real golf club. The sound electronics may also be simulative of an actual ball strike.

In use of the exemplary embodiment, a user may decide what size or type of golf club he wants to swing and, therefore, simulated by the handheld gaming device 10. The club choice may be selected simply by holding the shaft housing 120 at an angle corresponding to predetermined club data stored in memory. The IMU 161 is able to determine the angle of the shaft housing 120 as described above and publish appropriate feedback to the display 102. This process may be repeated until the user selects the desired club via the input member 100. Alternatively, the club choice may be selected by the user speaking a numeric or alphanumeric designation into the microphone or by pressing a respective input button. The club selection is then "published" on the digital display 42 and may be communicated to other components as described above.

The user may grasp the grip member 130 and prepare to swing the club (i.e. the handheld gaming device) in a manner similar to swinging a real golf club. Before swinging, however, the angle of the shaft housing 120 must be properly angled and the head housing 140 appropriately positioned relative to a simulated ball. Electronics associated with the IMU 161 determine angle data regarding the position of the shaft housing 120. When the circuitry or processor determines, that the shaft angle and club head face are properly positioned, the LEDs may be energized or images published to the digital display 102 to communicate to a user that the shaft housing 120 is ready to swing.

Then, when the user swings the gaming device 10, the sensors of the IMU 161 and, in an embodiment, an optics assembly, may collect swing data that enables a trajectory of a virtual ball or other object to be calculated and published to the display 102. Using wireless signal transmission, such as Bluetooth, the trajectory or other swing statistics may be transmitted to a remote device such as a laptop computer, remote display screen, or other remote electronic device. Various haptic sensations or sound may also be actuated as described previously.

It is understood that while certain forms of this invention have been illustrated and described, it is not limited thereto except insofar as such limitations are included in the following claims and allowable functional equivalents thereof. The principles and structures described herein may be applied to the movement of many other sports related devices and the simulation of many sports, games, and electronic gaming applications.

The invention claimed is:

1. An apparatus for simulating a gaming event, comprising:
   an inertial measurement unit ("IMU") associated with a handheld gaming device that is configured to detect and generate rate of acceleration data and angular rotation data regarding said handheld gaming movement;
   a processor positioned in said handheld gaming device in data communication with said IMU so as to receive said generated acceleration data and said angular rotation data;
   wherein said processor is programmed to use said generated acceleration data and said angular rotation data to determine current path data related to the motion of said gaming device; and
   an optics assembly associated with said handheld gaming device that includes an image sensor in data communication with said IMU and said processor and that includes an image target member displaced from said image sensor, said image sensor configured to generate image target data indicative of a spatial position of said image target member;

wherein said processor is programmed to use said generated acceleration and angular rotation data and said generated image target data to determine a virtual trajectory of said image target virtually impacted by said motion of said handheld gaming device.

2. The simulating apparatus as in claim 1, wherein said inertial measurement unit includes:
   at least one accelerometer configured to detect a rate of acceleration and generate motion data;
   a gyroscope sensor configured to detect rotational movement and generate angle data;
   a magnetometer sensor configured to detect spatial orientation and generate orientation data.

3. The simulating apparatus as in claim 2, wherein:
   said at least one accelerometer is one of a linear accelerometer and an angular accelerometer configured to detect translational or non-gravitational acceleration forces; and
   said gyroscope sensor is configured to detect pitch, yaw, and roll attributes of rotation.

4. The simulating apparatus as in claim 1, wherein:
   said image sensor is a camera configured to take a predetermined number of snapshots per second and to generate image data associated with said snapshots;
   wherein said image target is a landmark that, when captured by a respective snapshot by said image sensor, is indicative of a "moment" to be virtually impacted by a motion of said head housing.

5. The simulating apparatus as in claim 1, further comprising a digital display in data communication with said processor that is configured to provide a graphic user interface.

6. The simulating apparatus as in claim 5, wherein:
   said processor is programmed to determine a trajectory of a hypothetical target object that is virtually impacted upon an actual motion of said handheld gaming device according to said motion data and said angle data collected by said IMU both before and after a "moment" of impact determined by said optics assembly;
   said processor is programmed to publish data indicative of said determined trajectory to said digital display.

7. The simulating apparatus as in claim 1, further comprising an electronics module coupled to said handheld gaming device, said electronics module including said processor and said IMU.

8. The simulating apparatus as in claim 1, further comprising an input member coupled to said handheld gaming device that configured to receive input data from a user;
   wherein said input member includes:
      a digital display configured to provide a graphic user interface;
      a data entry component configured to receive data supplied by a user;
      a non-volatile memory configured to store said user supplied data, predetermined gaming device data, and programming instructions;
   wherein said processor is in data communication with said memory and is configured to execute said programming instructions.

9. The simulating apparatus as in claim 8, comprising programming in said memory that, when executed by said processor, causes said processor to publish digital data indicative of said trajectory to said digital display.

10. The simulating apparatus as in claim 8, wherein said processor is programmed to determine, via said IMU and said optics assembly, if an orientation of said gaming device matches predetermined orientation data associated with said gaming device and, if so, to publish an affirmative indicia to said digital display.

11. The simulating apparatus as in claim 8, wherein said data entry component includes a microphone being in data communication with said processor.

12. The simulating apparatus as in claim 1, wherein said handheld gaming device includes:
   an elongate shaft housing having opposed lower and upper ends and defining an interior area therebetween;
   a head housing coupled to said lower end of said shaft housing and defining an open space, a lower portion of said shaft housing situated in said open space;
   a battery; and
   an input member coupled to an outer surface of said shaft housing and electrically connected to said battery, said input member being configured to receive club selection data.

13. The simulating apparatus as in claim 12, further comprising an electronics module coupled to said shaft housing and electrically connected to said battery, said electronics module including said processor and said IMU.

14. The simulating apparatus as in claim 13, comprising circuitry in said electronics module configured to determine, using said acceleration data and said angle data and data from said optics assembly, the trajectory of a virtual golf ball impacted upon an actual swing of said shaft housing.

15. The simulating apparatus as in claim 1, comprising:
   a haptics member associated with said handheld gaming device and in data communication with said processor;
   wherein said IMU is configured to generate one of a vibration activation signal or a sound activation signal when said generated acceleration data and said angular rotation data are indicative that said handheld gaming device is in motion and is proximate said image target member;
   wherein said haptics member is actuated to cause one of a sound or vibration output upon receiving said vibration or said sound activation signal, respectively.

16. A method for simulating a gaming event, comprising:
   detecting and generating rate of acceleration data and angular rotation data via an inertial measurement unit ("IMU") that is associated with a handheld gaming device;
   using said generated acceleration data and said angular rotation data to determine current path data related to the motion of said gaming device;
   generating image target data indicative of a spatial position of an image target member via an optics assembly associated with said gaming device, said optics assembly including an image sensor in data communication with said IMU and said processor and that includes an image target member displaced from said image sensor, said image sensor configured to;
   using said generated acceleration and angular rotation data and said generated image target data to determine a virtual trajectory of said image target member virtually impacted by said motion of said handheld gaming device.

17. The method for simulating a gaming event as in claim 16, wherein said inertial measurement unit includes:
   at least one accelerometer configured to detect a rate of acceleration and generate motion data;
   a gyroscope sensor configured to detect rotational movement and generate angle data;
   a magnetometer sensor configured to detect spatial orientation and generate orientation data.

18. The method for simulating a gaming event as in claim 17, wherein:
said at least one accelerometer is one of a linear accelerometer and an angular accelerometer configured to detect translational or non-gravitational acceleration forces; and
said gyroscope sensor is configured to detect pitch, yaw, and roll attributes of rotation.

19. The method for simulating a gaming event as in claim 16, wherein:
said image sensor is a camera configured to take a predetermined number of snapshots per second and to generate image data associated with said snapshots;
wherein said image target is a landmark that, when captured by a respective snapshot by said image sensor, is indicative of a "moment" to be virtually impacted by a motion of said head housing.

20. The method for simulating a gaming event as in claim 16, further comprising:
providing a haptics member coupled to said handheld gaming device that is configured to one of vibrate or emit sound when actuated;
generating an activation signal when said generated acceleration data and said angular rotation data are indicative that said handheld gaming apparatus is in motion and is proximate said image target member; and
actuating said haptics member when said activation signal is generated.

* * * * *